United States Patent
Keppler et al.

(10) Patent No.: US 9,694,810 B2
(45) Date of Patent: Jul. 4, 2017

(54) METHOD FOR OPERATING A SIDE WIND ASSISTANT FOR A VEHICLE AND SIDE WIND ASSISTANT FOR A VEHICLE

(75) Inventors: Daniel Keppler, Althengstett (DE); Jens Kalkkuhl, Holzgerlingen (DE); Magnus Rau, Kirchheim unter Teck (DE); Van Tuan Tran, Berglen (DE)

(73) Assignee: Daimler AG, Stuttgart (DE)

( * ) Notice: Subject to any disclaimer, the term of this patent is extended or adjusted under 35 U.S.C. 154(b) by 182 days.

(21) Appl. No.: 14/126,337

(22) PCT Filed: Dec. 14, 2011

(86) PCT No.: PCT/EP2011/006296
§ 371 (c)(1),
(2), (4) Date: Mar. 20, 2014

(87) PCT Pub. No.: WO2012/171544
PCT Pub. Date: Dec. 20, 2012

(65) Prior Publication Data
US 2014/0200766 A1    Jul. 17, 2014

(30) Foreign Application Priority Data

Jun. 16, 2011 (DE) .................. 10 2011 106 601
Nov. 25, 2011 (DE) .................. 10 2011 119 462

(51) Int. Cl.
*A01B 69/00* (2006.01)
*B62D 6/00* (2006.01)
(Continued)

(52) U.S. Cl.
CPC ......... *B60W 30/02* (2013.01); *B60G 17/0165* (2013.01); *B60T 8/1755* (2013.01);
(Continued)

(58) Field of Classification Search
CPC ..... B60T 8/1755; B60T 2260/02; B62D 6/04; B62D 15/025; B62D 6/003;
(Continued)

(56) References Cited

U.S. PATENT DOCUMENTS 5,379,218 A * 1/1995 Jacobi .................... B62D 37/02
296/180.1
8,554,409 B2 10/2013 Kalkkuhl et al.
(Continued)

FOREIGN PATENT DOCUMENTS

CN          1978267 A    6/2007
DE    10 2004 017 638 A1   10/2005
(Continued)

OTHER PUBLICATIONS

International Search Report dated Mar. 27, 2012 with English translation (five (5) pages).
(Continued)

*Primary Examiner* — Harry Oh
(74) *Attorney, Agent, or Firm* — Crowell & Moring LLP

(57) ABSTRACT

A side wind assistant for a vehicle and a method for the operation of the side wind assistant involve detecting a side wind disturbance acting on the vehicle and reacting to the side wind disturbance by carrying out a side wind compensation intervention to at least partially compensate for the influence of the side wind disturbance, at least when an intervention threshold has been exceeded. The side wind assistant thus reacts to the side wind disturbance in a frequency selective manner in which the frequency selectivity is controlled depending on the side wind compensation or a state of the side wind assistant correlating with the side wind compensation intervention. In particular, the frequency selectivity is controlled depending on whether the side wind compensation intervention is carried out or not carried out,
(Continued)

Figure 1:
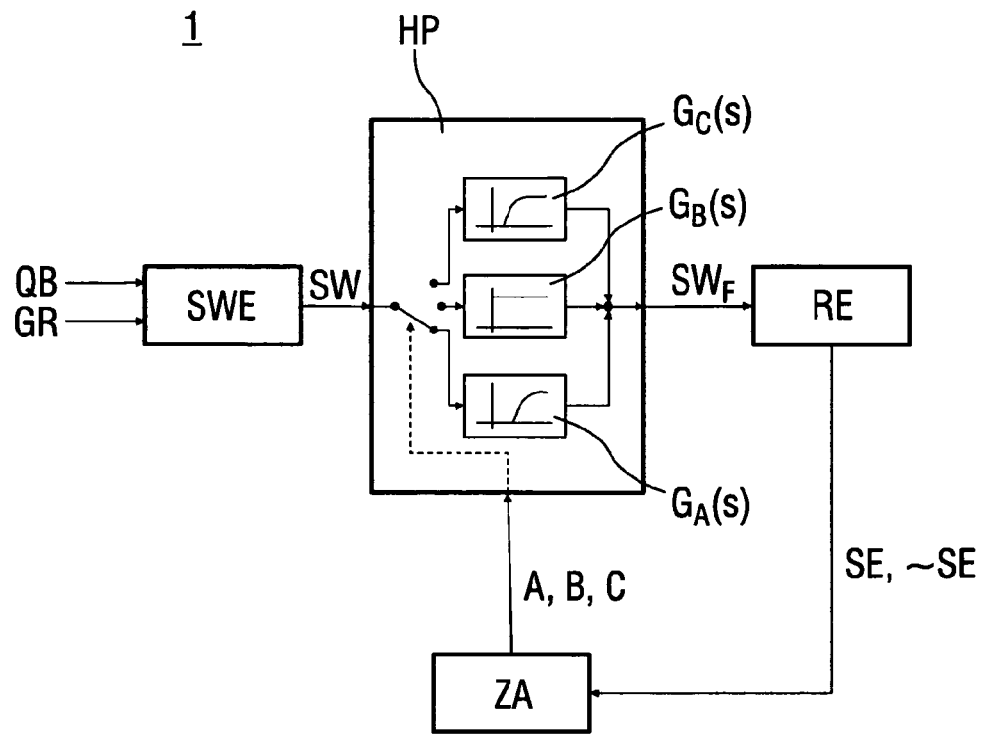

and depending on the duration of the side wind compensation intervention.

5 Claims, 2 Drawing Sheets

(51) Int. Cl.
| | | |
|---|---|---|
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *B60W 30/02* | (2012.01) | |
| *B62D 6/04* | (2006.01) | |
| *B60G 17/0165* | (2006.01) | |
| *B60T 8/1755* | (2006.01) | |
| *B60W 10/188* | (2012.01) | |
| *B60W 10/20* | (2006.01) | |
| *B60W 10/22* | (2006.01) | |
| *B60W 30/12* | (2006.01) | |
| *B60W 50/00* | (2006.01) | |

(52) U.S. Cl.
CPC .......... *B60W 10/188* (2013.01); *B60W 10/20* (2013.01); *B60W 10/22* (2013.01); *B60W 30/12* (2013.01); *B62D 6/04* (2013.01); *B60G 2400/841* (2013.01); *B60W 2050/0057* (2013.01); *B60W 2550/12* (2013.01)

(58) Field of Classification Search
CPC ......... B60G 2400/841; B60G 17/0165; B60W 10/20; B60W 2550/12; B60W 10/18; B60W 10/188; B60W 10/22; B60W 2050/0057; B60W 30/02
USPC ........................................................... 701/41
See application file for complete search history.

(56) References Cited

U.S. PATENT DOCUMENTS

| | | | |
|---|---|---|---|
| 2007/0150145 A1* | 6/2007 | Cho ..................... | B60W 10/18 701/41 |
| 2007/0210731 A1* | 9/2007 | Yoshiura .............. | G05B 19/404 318/163 |
| 2010/0262328 A1* | 10/2010 | Ammon .............. | B60T 8/17555 701/31.4 |
| 2012/0061169 A1* | 3/2012 | Oblizajek ............ | B62D 5/0472 180/446 |

FOREIGN PATENT DOCUMENTS

| | | |
|---|---|---|
| DE | 10 2005 059 814 B3 | 6/2007 |
| DE | 10 2008 017 950 A1 | 10/2009 |
| JP | 2007-112366 A | 5/2007 |
| JP | 2007-237840 A | 9/2007 |

OTHER PUBLICATIONS

Japanese Notification of Reason for Refusal dated Mar. 3, 2015, with partial English translation (Five (5) pages).
Partial English Translation of Chinese Office Action from Chinese Patent Office (Three (3) pages), mailed Jun. 17, 2015.

* cited by examiner

METHOD FOR OPERATING A SIDE WIND ASSISTANT FOR A VEHICLE AND SIDE WIND ASSISTANT FOR A VEHICLE

BACKGROUND AND SUMMARY OF THE INVENTION

Exemplary embodiments of the present invention relate to a method for operating a side wind assistant for a vehicle and a side wind assistant.

German patent document DE 10 2004 017 638 A1 discloses a device and method for determining a side wind force acting on a vehicle, in particular on a personal motor vehicle or a heavy goods vehicle. The device has an estimation means for the estimation of side wind power by means of a lateral acceleration value and a yaw rate value based on a vehicle model. Here, the lateral acceleration value is registered as a lateral acceleration sensor value with the aid of a lateral acceleration sensor and/or the yaw rate value is registered as a yaw rate sensor value with the aid of a yaw rate sensor. The vehicle model is a linearized, lateral dynamic single-track model of the vehicle.

German patent document DE 10 2008 017 950 A1 discloses a method for influencing the lateral dynamics of a vehicle in which a lateral dynamics disturbance acting on the vehicle, and in particular the vehicle body, is detected by means of a disturbance determination device, and a counter yawing moment that counteracts the lateral dynamics disturbance is generated by the following method steps:

- detecting the dynamic lateral dynamics disturbance by means of the disturbance determination device,
- generating a first counter yawing moment for the at least partial compensation for the dynamic lateral dynamics disturbance with the aid of a first vehicle system,
- breaking down the first counter yawing moment after the at least partial compensation for the dynamic lateral dynamics disturbance,
- with the aid of the disturbance determination device, checking whether a stationary lateral dynamics disturbance is present and generating a second counter yawing moment with the aid of a second vehicle system for the at least partial compensation for the stationary lateral dynamics disturbance when a stationary later dynamics disturbance has been detected.

Here, dynamic side wind disturbances are first detected and least partially compensated for over a limited period of time by individually applying the brakes for each wheel. After the application of the brakes, stationary side wind disturbances that are potentially present are detected and compensated for by a steering intervention.

Exemplary embodiments of the present invention are directed to an improved method and an improved device for the compensation for side wind disturbances.

The method according to the invention relates to a side wind assistant used in a vehicle in order to detect a side wind disturbance acting on the vehicle and in order to react to this by carrying out a side wind compensation intervention that counteracts the side wind disturbance when an intervention threshold has been exceeded. According to the invention, the reaction of the side wind assistant to the detected side wind disturbance is frequency selective, wherein the frequency selectivity is controlled depending on the side wind compensation intervention or on a state of the side wind assistant that correlates with the side wind compensation intervention. The state of the side wind assistant that correlates with the side wind compensation intervention, hereinafter also known as the intervention state, displays whether the side wind assistant is in a state in which it is carrying out a side wind compensation intervention or whether it is in a state in which it is not carrying out a side wind compensation intervention.

This means that the side wind assistant reacts to a side wind disturbance with a frequency sensitivity controlled depending on the side wind compensation intervention or the side wind state.

Side wind disturbance is, in the present case, understood to be a side wind or a signal correlating with the side wind that acts on the vehicle; the side wind disturbance is in particular a measurement for the power or intensity of the side wind acting on the vehicle. The purpose of the side wind assistant is therefore to compensate for the effect on the lateral dynamics of the vehicle resulting from the side wind, at least if the side wind disturbance exceeds an intervention threshold, i.e. if the side wind acts at least with a minimum force. Compensation is not necessarily to be understood to be complete compensation—partial compensation is advantageous, since the driver can then still detect the side wind disturbance due to the remaining deviation and thus receives a response regarding the present disturbance.

The control of the frequency selectivity of the side wind assistant preferably takes place depending on the duration of the side wind compensation intervention.

In an advantageous embodiment of the method, the frequency selectivity is controlled in such a way that, when it does not carry out any side wind compensation intervention, the side wind assistant reacts to frequency proportions of the side wind disturbance that lie beneath a definable first threshold frequency.

In a further advantageous embodiment of the method, the frequency selectivity is controlled in such a way that the side wind assistant, with the initiation of the side wind compensation intervention for the duration of the side wind compensation intervention, yet at most until the expiration of a definable holding duration, reacts to all or virtually all frequency proportions of the side wind disturbance.

In a further advantageous embodiment of the method, the frequency selectivity is controlled in such a way that, after the expiration of the definable holding duration, the side wind assistant does not react to the frequency proportions of the side wind disturbance, which lie beneath a second threshold frequency, wherein the second threshold frequency is lower than the first threshold frequency.

The side wind assistant preferably comprises a regulating device for carrying out the side wind compensation intervention, as well as a controllable high-pass filter provided upstream of the regulating device for the filtering of the side wind disturbance, such that the side wind compensation intervention is carried out based on the filtered side wind disturbance. The frequency selectivity of the side wind assistant is hereby controlled by varying a filter time constant of the high-pass filter.

The controllable high-pass filter is based on a conventional high-pass filter. The difference from a conventional high-pass filter is that the time constant of the high-pass filter can be varied and the high-pass filtering can be stopped.

The transfer function of a high-pass filter is:

$$G_{HP}(s) = 1 - G_{PT}(s)$$

Here, $G_{PT}(s)$ is the transfer function of a low-pass filter. A low-pass filter of the first order has the transfer function $$G_{PT}(s) = \frac{1}{1 + Ts}$$

The time constant T determines the temporal behavior of the low-pass filter. The controllable high-pass filter can be based on a low-pass filter of the first order or higher.

The controllable high-pass filter renders this time constant T variable, depending on various conditions. The controllable high-pass filter here switches between various time constants and thus configures the dynamics of the high-pass filter. The switching can take place continuously or discreetly.

In addition, the function of the high-pass filter can be stopped, depending on various conditions. In this case, the transfer function of the high-pass filter corresponds to the transfer function of an all-pass filter $G_{AP}(s)=1$, such that the direct components are passed through.

The side wind compensation intervention can therefore be optimally adapted to the sensors used, to the vehicle used and to the driver, since the duration of the side wind compensation intervention, the dynamics of the offset alignment and the duration of the transfer to the driver can be adapted after the completion of the side wind compensation intervention.

It is possible to differentiate dynamic side wind disturbances from stationary side wind disturbances by means of the controllable high-pass filter. In addition, the side wind compensation intervention and a transfer of control from the side wind assistant to the driver can be configured.

Furthermore, the offsets, which, for example, originate from the driving dynamics sensors, can be reduced or removed.

The dynamics of the vehicle can be adapted to the dynamics of side wind gusts.

The controllable high-pass filter can be or become switched to a state A, even if no side wind compensation intervention is carried out, wherein the controllable high-pass filter is operated with a first filter time constant in the state A, such that frequency proportions of the signal are blocked up to a predetermined first threshold frequency.

The controllable high-pass filter can be switched from the state A to a state B when the intervention threshold has been exceeded by the filtered signal, such that a side wind compensation intervention is initiated, wherein the controllable high-pass filter is operated virtually as an all-pass filter in the state B with a very large filter time constant.

The controllable high-pass filter can be switched from the state B to a state C when a duration of the side wind compensation intervention reaches or exceeds a predetermined holding duration, wherein the controllable high-pass filter is operated in the state C with a second filter time constant, such that frequency proportions of the signal are blocked up to a predetermined second threshold frequency, wherein the second filter time constant is greater than the first filter time constant.

The controllable high-pass filter can be switched from the state B to the state A when the side wind compensation intervention is completed before the expiration of the holding duration. Furthermore, the controllable high-pass filter can be switched from the state C to the state A when the side wind compensation intervention is completed.

The frequency sensitivity is controlled in such a way that the side wind assistant does not react to frequency proportions of the side wind disturbance lying beneath a definable first threshold frequency, that it, with the initiation of the side wind compensation intervention for the duration of the side wind compensation intervention, yet at most until the expiration of a definable period of time, the holding duration, reacts to at least virtually all frequency proportions of the side wind disturbance, and that, after the expiration of the holding duration, it does not react to frequency proportions of the side wind disturbance that lie beneath a second threshold frequency, wherein the second threshold frequency is lower than the first threshold frequency. In addition, the side wind assistant preferably only reacts to side wind disturbances that exceed a definable intervention threshold.

This functionality is achieved by a signal representing the side wind disturbance being guided via the controllable high-pass filter to the regulating device, which then carries out the side wind compensation intervention depending on the filtered signal, i.e. depending on the filtered side wind disturbance. The high-pass filter is thus controlled in such a way that its transfer behavior is modified depending on the intervention state of the side wind assistant or, synonymously, depending on the intervention state of the regulating device. Here, for example, the following intervention states are provided: the side wind compensation intervention is carried out; the side wind compensation intervention is not carried out; the intervention duration is short; the intervention duration is long.

The side wind compensation intervention can be embodied as a steering intervention and/or an application of the brakes that is individual for each wheel and/or an intervention for chassis bracing.

The controllable high-pass filter can be implemented as a digital filter, in particular as a software function that runs in a processor. An individual filter or parallel connection of several individual filters corresponding to the number of different states can also be used as the controllable high-pass filter, one of which respectively is activated depending on the state.

A controllable high-pass filter of the first order or higher can be used.

The holding duration can be predetermined depending on the type of side wind compensation intervention, in particular depending on whether the side wind compensation intervention is carried out as a steering intervention, application of brakes or chassis intervention.

A side wind assistant according to the invention for carrying out a side wind compensation intervention for the partial or complete compensation for the influence of a side wind disturbance acting on the vehicle has a transfer behavior that is frequency sensitive, in particular frequency selective, wherein the frequency sensitivity or frequency selectivity can be controlled depending on the side wind compensation intervention or a state that correlates with the side wind compensation intervention, hereinafter known as the intervention state, of the side wind assistant.

The side wind assistant according to the invention comprises means for registering the side wind disturbance and for generating a signal corresponding to the side wind disturbance, which can be used in a regulating device for carrying out a side wind compensation intervention in at least one vehicle system, in such a way that the influence of the side wind is at least partially compensated for at least when an intervention threshold has been exceeded. In this case, a controllable high-pass filter is provided, via which the signal can be supplied to the regulating device, wherein a filter time constant of the controllable high-pass filter can be modified depending on an intervention state of the regulating device.

The switching of the filtering characteristics of the controllable high-pass filter has the following effect: as long as the calculated side wind power is too low for a side wind compensation intervention that compensates for the side wind, a fast filtering time is selected, for example 1 second, so that the controllable high-pass filter is fast enough to compensate quickly for disturbances and offsets. The side wind assistant is thus also prevented from reacting when there are disturbances that are so slow or so small that they are compensated for by the driver without any assistance. As soon as the filtered side wind power exceeds an intervention threshold value, the driver is to be completely supported for a parametrizable holding duration. To that end, the controllable high-pass filter is stopped, as otherwise the calculated side wind power is filtered away quickly and thus the support for the driver is ended. The holding duration can therefore be adjusted. By stopping the controllable high-pass filter, it can be adjusted how long the driver is to be supported when there are strong side winds. For example, when there is application of the brakes, it should be ensured that the brake wear and the heating of the brakes do not become too large, while the driver can also be supported for a longer period of time with a corresponding steering intervention. Since the stopped, controllable high-pass filter behaves like an all-pass filter, direct components, i.e. offsets, are also passed through. The offsets of the sensors change much more slowly in proportion to wind disturbances and are thus of no consequence during the holding duration.

In order to end the side wind compensation intervention gently again and to return control to the driver, after a side wind compensation intervention that lasts longer than the holding duration, it is not switched back to the first, small filter time constant, but rather to a second, slower filter time constant, for example 2.5 seconds. If the side wind lasts longer, the side wind compensation intervention that compensates for the side wind is, if necessary, ended, although a strong side wind is still present. If, in this case, the fast filter time constant were to be selected, there would be the problem that the driver could be surprised again by the side wind, since, from the view of the driver, it makes no difference whether the side wind or the compensatory side wind compensation intervention suddenly ceases. By switching to the slower time constant, the transfer from a state in which the side wind compensation intervention is carried out to a state in which the driver fully takes control during a side wind that lasts for a long time can be set.

The filtering frequency of the controllable high-pass filter changes as a result of the selected time constant. With the slower time constant, the controllable high-pass filter reduces the direct component of the side wind signal more slowly. The side wind compensation intervention is therefore withdrawn more slowly and the driver can take over control more slowly. The side wind compensation intervention can be carried out roughly proportionally to the high-pass-filtered side wind signal. The correction intervention thus corresponds to the high-pass-filtered side wind disturbance, multiplied by a weighting factor.

Thus, the side wind compensation intervention is again withdrawn slowly, for example by braking on one side, and the driver can slowly steer against the side wind. After the side wind compensation intervention that compensates for the side wind has ended, the fast filter time is switched back to.

BRIEF DESCRIPTION OF THE DRAWING FIGURES

Exemplary embodiments of the invention are illustrated in greater detail with the aid of drawings.

Figure 2:
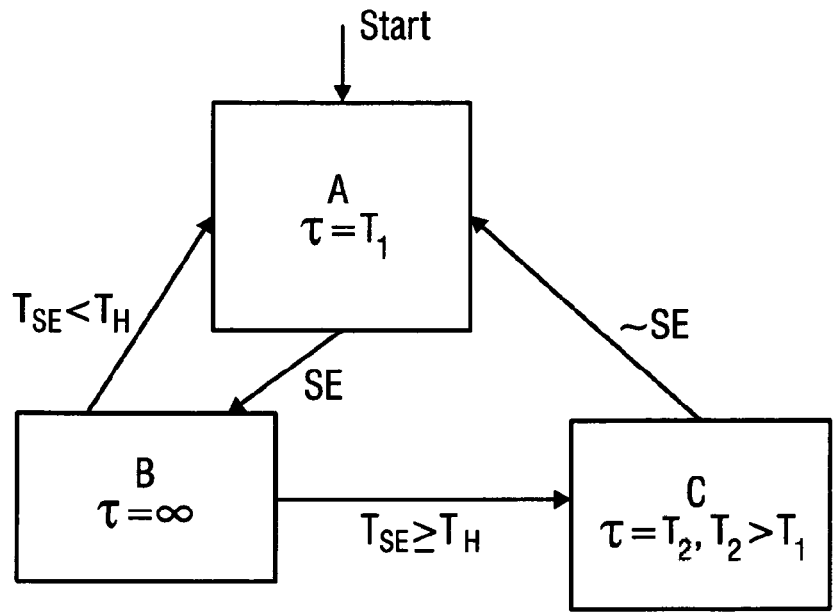
Figure 3:
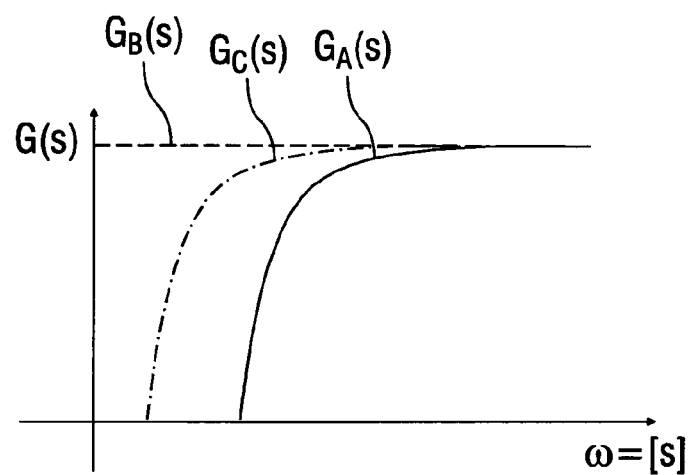

Here are shown:

FIG. 1 a schematic view of a side wind assistant for compensating for a side wind disturbance acting on a vehicle, FIG. 2 a schematic sequence of a method for operating the side wind assistant from FIG. 1, FIG. 3 transfer functions of one of the controllable high-pass filters in three different intervention states of the side wind assistant.

Parts that correspond to one another have the same reference numerals in all figures.

DETAILED DESCRIPTION

FIG. 1 shows a schematic view of a side wind assistant 1 for compensating for the influence of a side wind disturbance acting on a vehicle. The side wind assistant 1 comprises a controllable high-pass filter HP and a regulating device RE and a side wind registration device SWE. The side wind registration device SWE evaluates a lateral acceleration QB detected by sensors and a yaw rate GR of the vehicle and from this determines a signal SW that correlates with the side wind, which signal corresponds to the side wind disturbance acting on the vehicle, i.e. the side wind power acting on the vehicle.

The signal SW is supplied to the controllable high-pass filter HP for filtering. This transmits the filtered signal SWF to the regulating device RE, which carries out a side wind compensation intervention into at least one vehicle system (not depicted) with the filtered signal SWF when an intervention threshold is exceeded, for example into a steering system, braking system, or braceable chassis, in order to compensate for the influence of the side wind on the vehicle. The regulating device RE is therefore located in one of two states SE or ~SE, which are also known as intervention states, wherein the state SE corresponds to a state in which a side wind compensation intervention is carried out, i.e. in which the side wind assistant 1 actively engages with the lateral dynamics of the vehicle, and wherein the state ~SE is a state in which no side wind compensation intervention is carried out, i.e. in which the side wind assistant 1 is passive. Depending on the states SE or ~SE and, if necessary, on a duration of the side wind compensation intervention TSE compared to a predetermined holding duration TH, a time duration evaluation ZA in the controllable high-pass filter HP adjusts one of three transfer functions GA(s), GB(s), GC(s), which are depicted as an example in FIG. 3.

FIG. 2 shows a schematic sequence of a method for operating the side wind assistant shown in FIG. 1.

The controllable high-pass filter HP is controlled in such a way that it has the following states:

State A: Frequencies up to a predetermined first threshold frequency $\omega g1$ are blocked if no side wind compensation intervention ~SE is carried out, as the filtered signal SWF is smaller than an intervention threshold, i.e. as the filtered side wind disturbance is low or only built up slowly;

This corresponds to the adjustment of the filter time constants $\tau$ to a predetermined first value $\tau=T1=1/\omega g1$ (e.g. 1 second=>fast filter time). For the transfer function of the high-pass filter, $GA(s)=1-1(1+T1 s)$ then applies, wherein s represents the Laplace variable (complex frequency variable).

As a consequence, this has the following mode of action: With low side wind disturbance, the controllable high-pass filter HP is fast (short time constant T1). Disturbances and offsets are passed through quickly and the side wind compensation intervention SE is—as soon as the filtered side wind disturbance is increased to such an extent that the intervention threshold is exceeded—quickly initiated.

Side wind disturbances that are, however, so weak or slow (with low-frequency) that the filtered side wind disturbance does not exceed the intervention threshold, do not lead to any side wind compensation intervention. Such side wind disturbances are so low or slow that the driver can compensate for them himself without any problems, such that the side wind assistant does not react to such disturbances.

State B: By introducing a side wind compensation intervention, i.e. transferring from state ~SE to state SE, all or virtually all frequencies of the side wind disturbance SW are passed through, as long as the duration of the side wind compensation intervention does not exceed a predetermined holding duration TH.

This corresponds to a temporally restricted stopping of the controllable high-pass filter HP or a temporally restricted adjustment of a very high filter time constant τ or a very low threshold frequency ω, such that the controllable high-pass filter HP then temporarily functions like or virtually like an all-pass filter. GB(s)≈1 then applies for the transfer function.

As consequence, this has the following mode of action: as soon as the filtered signal SWF exceeds the intervention threshold, the driver is completely supported for a parametrizable holding duration TH. To that end, the controllable high-pass filter HP must be stopped, such that virtually all frequency proportions are passed through. Otherwise, the calculation side wind disturbance would be filtered out again quickly and thus the support for the driver would end.

State C: During the duration of the side wind compensation intervention, frequencies up to a predetermined second threshold frequency ωg2 are blocked if the duration TSE of the side wind compensation intervention exceeds the predetermined holding duration TH, wherein the second threshold frequency ωg2 is smaller than the first threshold frequency ωg1: ωg2<ωg1.

This corresponds to the adjustment of the time constant τ of the controllable high-pass filter HP to a predetermined second value τ=T2=1/ωg2, where T2>T1, for example T2=2.5 seconds, i.e. a slower filter time than T1. G(s)=1−1/(1+T2 s) then applies for the transfer function of the high-pass filter.

$G_A(s) = 1 - \dfrac{1}{1 + T_1 \cdot s}$   This equation applies if no side wind compensation intervention is carried out.

$G_B(s) \approx 1$   This equation applies if a side wind compensation intervention is carried out and if the predetermined holding duration $T_H$ has not yet been exceeded. If the side wind compensation intervention ends as a result of a side wind disturbance that only has an effect for a short period of time, before the predetermined holding duration $T_H$ expires, a switching to the transfer function $G_A(s)$ is carried out.

$G_C(s) = 1 - \dfrac{1}{1 + T_2 \cdot s}$ where $T_2 > T_1$   This equation applies if a longer-lasting side wind compensation intervention is carried out, i.e. if the predetermined holding duration $T_H$ is exceeded. As soon as the side wind compensation intervention ends because the driver compensates for the side wind disturbance himself by steering, or because the side wind disturbance no longer exists, it is in turn switched back to the transfer function $G_A(s)$.

As a result, the filter time constant τ is switched to a default value T1 if no side wind disturbances are to be compensated for by the system. A side wind compensation intervention is then only initiated if dynamic side wind disturbances, which exceed a predetermined intervention threshold, have been detected. With the initiation of the side wind compensation intervention, the frequency selectivity of the high-pass filter HP is modified by changing the filter transfer function in such a way that stationary side wind disturbances as well as dynamic side wind disturbances are now compensated for temporarily for a predetermined holding duration TH, and the driver receives full support. After the expiration of the predetermined holding time TH, the frequency selectivity of the high-pass filter HP is in turn modified by adjusting a slower filter time constant τ=T2 compared to the default value, such that the side wind compensation intervention is slowly broken down and the control is slowly transferred back to the driver. Then, after the side wind compensation intervention has been completed, the filter time τ is switched back to the default value T1. Stationary disturbances that still potentially remain can then be compensated for by the driver by manually steering.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for the operation of a side wind assistant of a vehicle, the method comprising:
   registering, by the side wind assistant, a side wind disturbance acting on the vehicle; and
   reacting to the registered side wind disturbance, at least when an intervention threshold is exceeded, by carrying out a side wind compensation intervention that counteracts the side wind disturbance,
   wherein the reaction of the side wind assistant to the side wind disturbance is frequency selective and the frequency selectivity is controlled depending on the side wind compensation intervention,
   wherein the frequency selectivity is controlled in such a way that the side wind assistant does not react to frequency proportions of the side wind disturbance lying beneath a definable first threshold frequency when the side wind assistant is in a state in which it does not carry out a side wind compensation intervention,
   wherein the frequency selectivity is controlled in such a way that the side wind assistant, with initiation of the side wind compensation intervention for a duration of the side wind compensation intervention and at most until the expiration of a definable holding duration, reacts to all frequency proportions of the side wind disturbance, wherein the frequency selectivity is controlled in such a way that the side wind assistant does not react to frequency proportions of the side wind disturbance lying beneath a second threshold frequency after the expiration of the definable holding duration, wherein the second threshold frequency is smaller than the first threshold frequency.

2. A method for the operation of a side wind assistant of a vehicle, the method comprising:

registering, by the side wind assistant, a side wind disturbance acting on the vehicle; and reacting to the registered side wind disturbance, at least when an intervention threshold is exceeded, by carrying out a side wind compensation intervention that counteracts the side wind disturbance, wherein the reaction of the side wind assistant to the side wind disturbance is frequency selective and the frequency selectivity is controlled depending on the side wind compensation intervention or a state of the side wind assistant correlating with the side wind compensation intervention, wherein the side wind assistant has a regulating device for carrying out the side wind compensation intervention and a controllable high-pass filter provided upstream of the regulating device for the filtering of the side wind disturbance, and the frequency selectivity of the side wind assistant is controlled by varying a filter time constant of the high-pass filter, and wherein the filter time constant of the high-pass filter is adjustable in such a way that the controllable high-pass filter is operable in a state A, wherein it blocks frequency proportions of the side wind disturbance up to a first threshold frequency, a state B, wherein it passes through all frequency proportions of the side wind disturbance, and a state C, wherein it blocks frequency proportions of the side wind disturbance up to a second threshold frequency, wherein the second threshold frequency is smaller than the first threshold frequency, and the controllable high-pass filter is operated in the state A when the side wind assistant is currently not carrying out any side wind compensation intervention, is switched from the state A to the state B when a filtered side wind disturbance resulting from the filtering of the side wind disturbance exceeds an intervention threshold, such that a side wind compensation intervention is initiated, is switched from the state B to the state C when a duration of the side wind compensation intervention reaches or exceeds a predetermined holding duration, is switched from the state B to the state A when the side wind compensation intervention is completed before the expiration of the holding duration, is switched from the state C to the state A when the side wind compensation intervention is completed.

3. The method according to claim 2, wherein the holding duration is predetermined depending on the type of side wind compensation intervention.

4. The method according to claim 1, wherein the side wind compensation intervention is a steering intervention, an application of the brakes that is individual for each wheel, or an intervention for chassis bracing.

5. A side wind assistant for a vehicle, comprising:

a regulating device configured to perform a side wind compensation intervention at least when an intervention threshold is exceeded; and a controllable high-pass filter provided upstream of the regulating device, wherein the controllable high-pass filter is configured to filter a side wind disturbance, wherein a frequency selectivity of the side wind assistant is controlled by varying a filter time constant of the high-pass filter, and wherein the filter time constant of the high-pass filter is adjustable in such a way that the controllable high-pass filter is operable in a state A, wherein it blocks frequency proportions of the side wind disturbance up to a first threshold frequency, a state B, wherein it passes through all frequency proportions of the side wind disturbance, and a state C, wherein it blocks frequency proportions of the side wind disturbance up to a second threshold frequency, wherein the second threshold frequency is smaller than the first threshold frequency, and the controllable high-pass filter is operated in the state A when the side wind assistant is currently not carrying out any side wind compensation intervention, is switched from the state A to the state B when a filtered side wind disturbance resulting from the filtering of the side wind disturbance exceeds an intervention threshold, such that a side wind compensation intervention is initiated, is switched from the state B to the state C when a duration of the side wind compensation intervention reaches or exceeds a predetermined holding duration, is switched from the state B to the state A when the side wind compensation intervention is completed before the expiration of the holding duration, is switched from the state C to the state A when the side wind compensation intervention is completed.

\* \* \* \* \*